(12) United States Patent
Zawacki et al.

(10) Patent No.: US 8,738,651 B2
(45) Date of Patent: May 27, 2014

(54) TECHNIQUES FOR UPDATING A RELEVANT DOCUMENT LIST ASSOCIATED WITH A SOFTWARE APPLICATION WITHIN A COMPUTER SYSTEM

(75) Inventors: Jennifer G. Zawacki, Hillsborough, NC (US); David C. Challener, Raleigh, NC (US); Justin T. Dubs, Durham, NC (US); James J. Thrasher, Efland, NC (US)

(73) Assignee: Lenovo (Singapore) Pte Ltd, Singapore (SG)

( * ) Notice: Subject to any disclaimer, the term of this patent is extended or adjusted under 35 U.S.C. 154(b) by 907 days.

(21) Appl. No.: 12/043,280

(22) Filed: Mar. 6, 2008

(65) Prior Publication Data
US 2009/0228470 A1    Sep. 10, 2009

(51) Int. Cl.
*G06F 17/30* (2006.01)
(52) U.S. Cl.
CPC ............................... *G06F 17/30705* (2013.01)
USPC ................... 707/776; 707/780; 707/E17.017

(58) Field of Classification Search
CPC . G06F 17/30876; G06F 3/0481; G06F 3/002; G06F 17/30; G06F 21/6218
USPC .......................................................... 707/776
See application file for complete search history.

(56) References Cited

U.S. PATENT DOCUMENTS

| | | | |
|---|---|---|---|
| 7,739,738 B1 * | 6/2010 | Sobel et al. | 726/24 |
| 8,280,946 B1 * | 10/2012 | Badros | 709/203 |
| 2005/0222981 A1 * | 10/2005 | Lawrence et al. | 707/3 |
| 2007/0276801 A1 * | 11/2007 | Lawrence et al. | 707/3 |
| 2008/0162498 A1 * | 7/2008 | Omoigui | 707/10 |

* cited by examiner

*Primary Examiner* — Shyue Jiunn Hwa
(74) *Attorney, Agent, or Firm* — Antony P. Ng; Yudell Isidore Ng Russell PLLC

(57) ABSTRACT

A technique for cataloging documents based on user activity includes assigning documents to a relevant document list based on activity of a user of a device. In this case, at least two of the documents are associated with different applications. The technique then provides the relevant document list to the user.

17 Claims, 2 Drawing Sheets

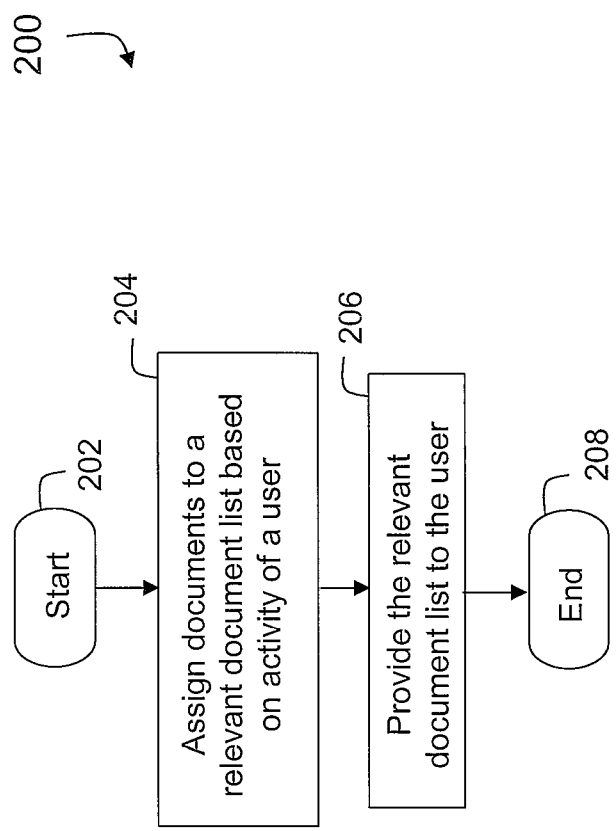

TECHNIQUES FOR UPDATING A RELEVANT DOCUMENT LIST ASSOCIATED WITH A SOFTWARE APPLICATION WITHIN A COMPUTER SYSTEM

BACKGROUND

1. Field

This disclosure relates generally to cataloging documents and, more specifically, to techniques for cataloging documents based on user activity.

2. Related Art

Today, devices such as desktop computer systems, notebook computer systems, laptop computer systems, and personal digital assistants (PDAs) execute a wide variety of applications. For example, a device may execute a word processor application, a spreadsheet application, a presentation application, a media player application, a web browser application, etc. Software vendors frequently package applications in an application suite. Typically, an application suite includes a number of separate applications that each employ a user interface with some commonality, which generally reduces a time associated with learning to proficiently use the separate applications. In many cases, applications are capable of interacting in ways beneficial to a user of the applications. For example, a spreadsheet document may be embedded in a word processor document, even though the spreadsheet document was created in a separate application.

Various applications, such as word processing applications, provide a 'recently accessed document list' that maintains a default number (or a user selected number) of recently accessed documents. In the event that a user of an application that provides a 'recently accessed document list' desires to access a document in the 'recently accessed document list', document access time is generally reduced as the user does not have to access a file system in order to access the document. Unfortunately, a 'recently accessed document list' frequently includes documents that are not relevant to current work performed by a user.

A known operating system (OS) employs a graphical user interface (GUI) application that provides a GUI that facilitates accessing a file system maintained by the OS. The GUI application provides a search function that allows a user to search for files (within the file system) whose name corresponds to a manually entered search string (or whose content includes the manually entered search string), among other functions. Unfortunately, a user may locate a number of documents that are not relevant when the search function of a GUI application is employed to locate documents of relevance to current work performed by the user.

SUMMARY

According to one aspect of the present disclosure, a technique for cataloging documents based on user activity includes assigning documents to a relevant document list based on activity of a user of a device. In this case, at least two of the documents are associated with different applications. The technique also includes providing (e.g., audibly or visually) the relevant document list to the user.

According to another aspect of the present disclosure, a device (e.g., a computer system) includes a display and a processor coupled to the display. The processor is configured to assign documents to a relevant document list based on activity of a user of the device. At least two of the documents are associated with different applications. The processor is also configured to provide the relevant document list to the user via the display.

BRIEF DESCRIPTION OF THE DRAWINGS

The present invention is illustrated by way of example and is not intended to be limited by the accompanying figures, in which like references indicate similar elements. Elements in the figures are illustrated for simplicity and clarity and have not necessarily been drawn to scale.

FIG. 2 is a flowchart of a process for cataloging documents based on user activity, according to an embodiment of the present disclosure.

DETAILED DESCRIPTION

Figure 1:
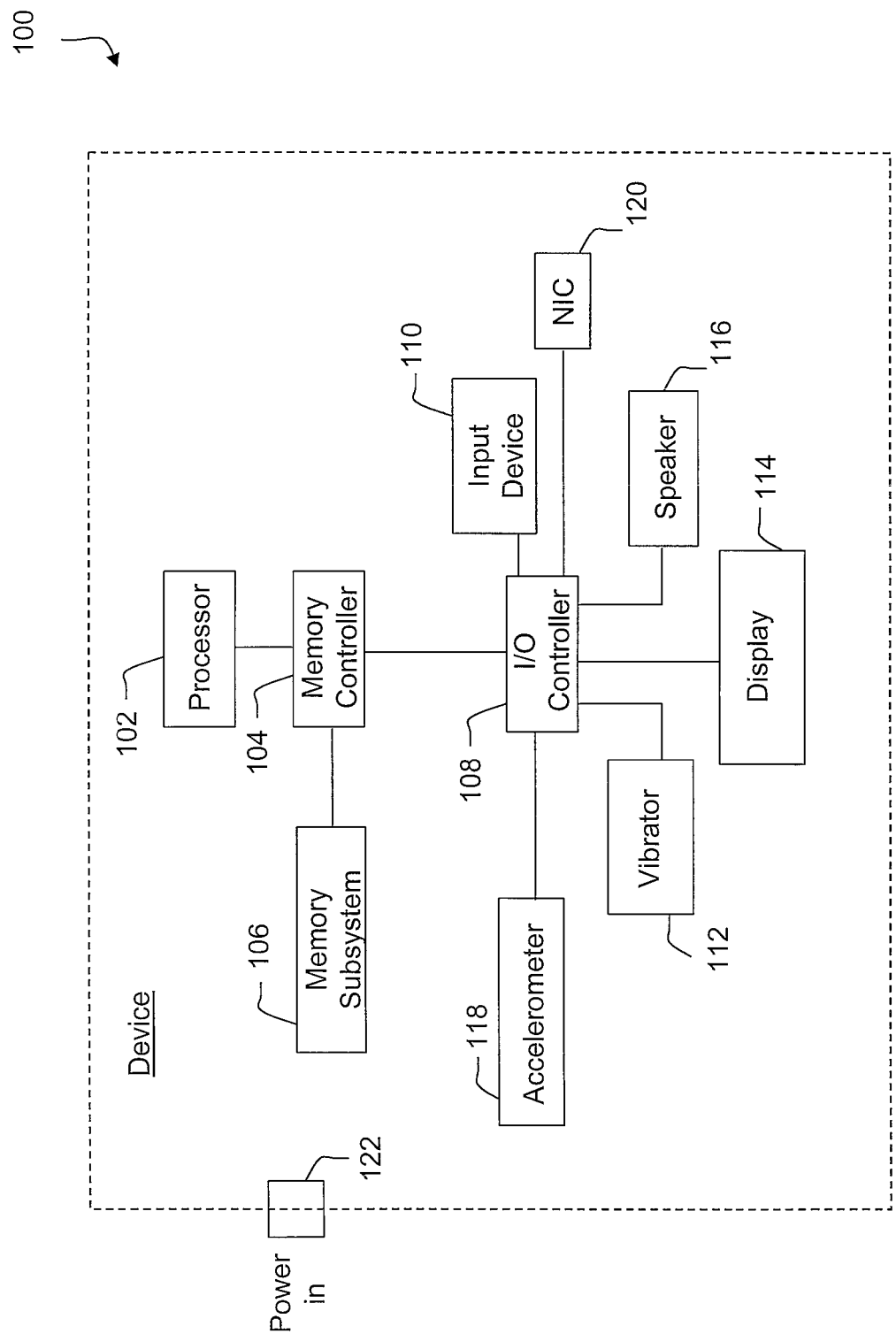
FIG. 1 is a block diagram of a relevant portion of an example device that is configured to catalog documents based on user activity, according to various embodiments of the present disclosure.

As will be appreciated by one of ordinary skill in the art, aspects of the present invention may be embodied as a method, system, device, or computer program product. Accordingly, the present invention may take the form of an entirely hardware embodiment, an entirely software embodiment (including firmware, resident software, microcode, etc.) or an embodiment combining software and hardware aspects that may all generally be referred to herein as a circuit, module, or system.

Any suitable computer-usable or computer-readable storage medium may be utilized. The computer-usable or computer-readable storage medium may be, for example, but is not limited to an electronic, magnetic, optical, electromagnetic, infrared, or semiconductor system, apparatus, or device. More specific examples (a non-exhaustive list) of the computer-readable storage medium includes the following: a portable computer diskette, a hard disk, a random access memory (RMC), a read-only memory (KOM), an erasable programmable read-only memory (EPROM) or flash memory, a portable compact disc read-only memory (CD-ROM), an optical storage device, or a magnetic storage device. Note that the computer-usable or computer-readable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this disclosure, a computer-usable or computer-readable storage medium may be any medium that can contain or store a program for use by or in connection with an instruction execution system, apparatus, or device. As used herein, the term "coupled" includes both a direct electrical connection between blocks or components and an indirect electrical connection between blocks or components achieved using one or more intervening blocks or components.

According to various aspects of the present disclosure, techniques are disclosed that provide access to files that are cataloged (in a relevant document list) based on current user activity. In general, cataloging files based on current user activity reduces the time required for a user to find files that are relevant to current work. Moreover, cataloging files that are associated with multiple applications in a single relevant document list that is associated with current work generally lowers access time to relevant documents associated with the current work. For example, current work of a user may involve files associated with a presentation application, a spreadsheet application, and a word processing application.

With reference to FIG. 1, an example device 100 is illustrated that may be configured to catalog documents based on user activity according to various embodiments of the present disclosure. The device 100 may be, for example, a computer system that executes an operating system (OS) and multiple applications. The device 100 includes a processor 102 that is coupled to a memory controller 104, which is coupled to a memory subsystem 106 and an input/output (I/O) controller 108. As is illustrated, the I/O controller 108 is coupled to an input device 110, a vibrator 112, a display 114, a speaker 116, an accelerometer 118, and a network interface controller (NIC) 120. The processor 102 may include one or more processor cores and one or more levels of cache. The memory subsystem 106 includes an application appropriate amount of volatile memory (e.g., dynamic random access memory (DRAM) and non-volatile memory (e.g., read-only memory (ROM) or flash memory). The input device 110 may include, for example, a mouse, a keyboard, and a microphone. The display 114 may be, for example, a cathode ray tube (CRT) or a liquid crystal display (LCD). The processor 102 may also be coupled to one or more mass storage devices (not shown), e.g., a hard disk drive (HDD) and a compact disc read-only memory (CD-ROM) drive, via a port. As is illustrated, the device 100 also includes a power-in port 122 for receiving a power adapter cable or an AC power cable.

With reference to FIG. 2, an example process 200 for cataloging documents based on user activity, according to an embodiment of the present disclosure, is illustrated. In block 202, the process 200 is initiated at which point control transfers to block 204. In block 204, the processor 102 assigns documents to a relevant document list based on activity of a user of the device 100. In this case, at least two of the documents are associated with different applications. For example, the documents may be associated with a spreadsheet application, a word processing application, and a presentation application, or any other type of application. When the documents are local documents (e.g., stored on a desktop computer of a user), activity of the user may be determined based on which of the different applications most recently had an associated window in focus. As another example, activity of the user may be determined based on which of the different applications is utilizing a greatest number of resources of the device 100. As yet another example, activity of the user may be determined based on which of the different applications had focus for a greater time period (e.g., within a predetermined recent time period (e.g., thirty minutes)). In any event, based on the activity of the user, a new document associated with the activity may be added to a relevant document list. Documents that are associated with a current active application may be listed in the relevant document list in order of most recently used (MRU) to least recently used (LRU) irrespective of document type or based on document type. In this case, documents may be deleted from the relevant document list based on a total document count and/or a total document type count for a given document type. For example, the relevant document list may maintain ten total documents, only four of which may be word processing documents.

A new remote document (i.e., a document that is not located on a user desktop computer) may be assigned to the relevant document list when an owner of the new document is included within a same active directory structure (e.g., of a company intranet) as the user. As another example, a new remote document may be assigned to the relevant document list based on a relationship of an owner of the new remote document to the user in a directory structure (e.g., of a company intranet). For example, when the owner of the new remote document is two or less branches from the user in a directory structure, the new remote document may be added to the relevant document list of the user. When the documents are remote documents, a remote document may be assigned to the relevant document list based on a keyword search of intranet documents.

As another example, potentially relevant remote documents may be provided by performing a keyword search of intranet documents. The potentially relevant remote documents may then be sorted to locate actually relevant remote documents, which may then be assigned to the relevant document list. The potentially relevant remote documents may be sorted based on, for example, a document type, an organizational relationship of a document owner to the user (e.g., whether the document owner and the user are in the same company department), a document age, or a combination thereof. The documents in the relevant document list may be replaced, for example, based on document type and document use. Next, in block 206, the relevant document list is provided to the user. For example, the relevant document list may be visually displayed or audibly provided (in systems that are speech enabled). Following block 206, control transfers to block 208 where the process 200 terminates.

Accordingly, techniques have been disclosed herein that readily facilitate cataloging documents (in a relevant document list) based on user activity.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method, comprising:
    associating a relevant document list with a software application, wherein said relevant document list contains a list of documents to be accessed by said software application;
    in response to a first document being accessed by a user via said software application, adding said first document to said relevant document list, wherein said first document is stored within a local computer system of said user, wherein a subset of documents within said relevant document list was generated by said software application while the remaining documents within said relevant document lists were generated by another software applications;
    in response to a second document being accessed by said user via said software application, adding said second document to said relevant document list, wherein said second document is stored in a remote computer system to which said local computer system is connected; and
    presenting said relevant document list to said user such that said user can pain access to said first and second documents with reduced time.

2. The method of claim 1, further comprising sorting said documents in said relevant document list by an ascending order of accesses.

3. The method of claim 1, further comprising sorting said documents in said relevant document list by document type.

4. The method of claim 1, further comprising sorting said documents in said relevant document list by document age.

5. The method of claim 1, further comprising removing documents from said relevant document list based on document count.

6. The method of claim 1, wherein said software application is a word processing program.

7. The method of claim 1, wherein said software application is a spreadsheet program.

8. The method of claim 1, wherein said software application is a presentation program.

9. A computer system, comprising:
    a processor;
    a hard disk drive;
    a memory coupled to said processor and said hard disk drive, wherein said memory includes a relevant document list associated with a software application, wherein said relevant document list includes a list of documents related to corresponding documents that are designed to be accessed by said software application,
    wherein a first document stored within said hard disk drive is added to said relevant document list after said first document has been accessed by a user via said software application, wherein a second document stored in a remote computer system is added to said relevant document list after said second document has been accessed by said user via said software application, wherein a subset of documents within said relevant document list was generated by said software application while the remaining documents within said relevant document lists were generated by another software applications; and
    a display for presenting said relevant document list to said user such that said user can access said first and second documents with reduced access time.

10. The device of claim 9, wherein said documents in said relevant document list are sorted by an ascending order of accesses.

11. The device of claim 9, wherein said documents in said relevant document list are sorted by document type.

12. The device of claim 9, wherein said documents in said relevant document list are sorted by document age.

13. The device of claim 9, wherein said software application is a word processing program.

14. The device of claim 9, wherein said software application is a spreadsheet program.

15. The device of claim 9, wherein said software application is a presentation program.

16. A computer-readable storage medium having a program product for updating a relevant document list within a computer system, said computer-readable storage medium comprising:
    program code for associating a relevant document list with a software application, wherein said relevant document list contains a list of documents to be accessed by said software application;
    program code for, in response to a first document being accessed by a user via said software application, adding said first document to said relevant document list, wherein said first document is stored within a local computer system of said user, wherein a subset of documents within said relevant document list was generated by said software application while the remaining documents within said relevant document lists were generated by another software applications;
    program code for, in response to a second document being accessed by said user via said software application, adding said second document to said relevant document list, wherein said second document is stored in a remote computer system to which said local computer system is connected; and
    program code for presenting said relevant document list to said user such that said user can access said first and second documents with reduced access time.

17. The computer-readable storage medium of claim 16, wherein said computer-readable storage medium further includes program code for removing documents from said relevant document list based on document count.

* * * * *